United States Patent [19]
Shoh

[11] 3,873,859
[45] Mar. 25, 1975

[54] ULTRASONIC WELDING TOOL
[75] Inventor: Andrew Shoh, Ridgefield, Conn.
[73] Assignee: Branson Instruments, Incorporated, Stamford, Conn.
[22] Filed: Feb. 21, 1974
[21] Appl. No.: 444,304

[52] U.S. Cl............. 310/8.1, 310/8.7, 310/26, 318/118, 318/116, 228/1
[51] Int. Cl................... H04r 17/00, B23k 1/06
[58] Field of Search......... 310/8.1, 8.2, 8.3, 8.7, 310/26, 9.1; 228/8, 10, 1; 200/61.42, 61.58 R; 318/116, 118

[56] References Cited
UNITED STATES PATENTS

| | | | |
|---|---|---|---|
| 2,592,649 | 4/1952 | Brackett | 200/61.58 R |
| 2,649,552 | 8/1953 | Burrell et al. | 200/61.58 R |
| 3,384,284 | 5/1968 | Obeda | 228/1 |
| 3,471,662 | 10/1969 | Berchtold | 200/61.58 R |
| 3,493,457 | 2/1970 | Jugler | 228/1 X |
| 3,610,506 | 10/1971 | Robinson | 228/1 |
| 3,649,420 | 3/1972 | Obeda | 228/1 |
| 3,790,059 | 2/1974 | Jacke et al. | 228/1 |

Primary Examiner—Mark O. Budd
Attorney, Agent, or Firm—Ervin B. Steinberg

[57] ABSTRACT

An improved manipulatable ultrasonic tool for spot welding includes as a part of its construction a pressure responsive switch to initiate the weld cycle or to transfer sonic energy to a workpiece only upon the existence of a predetermined engagement force between the tool's resonator and the workpiece.

4 Claims, 5 Drawing Figures

PRIOR ART

ULTRASONIC WELDING TOOL

BRIEF SUMMARY OF THE INVENTION

This invention refers to an ultrasonic welding tool as used for welding and assembling thermoplastic workpieces and more specifically concerns a manipulatable hand operated welding tool which is extremely useful for providing spot welds in hidden and normally inaccessible places.

U.S. Pat. No. 3,563,822 in the name of Stephen Fesh entitled "Method for Welding Thermoplastic Parts by Sonic Energy" issued Feb. 16, 1971 discloses a method for joining thermoplastic workpieces by providing spot welds. This technique has found wide-spread application in various industries, specifically in the assembly of wall panels, in the fabrication of furniture cabinets, all-terrain vehicles and the like.

For applications where the workpiece is generally too large to be brought to a stationary welding stand, or where the workpiece is of such shape that spot welds are required in corners and other inaccessible areas, various hand-held, portable ultrasonic welding units have been developed which include handles, pistol grips, etc. Such welders include hand or foot operated switches to initiate the weld cycle.

The prior art constructions have not been found entirely satisfactory and several shortcomings are manifest. Typically, the weld cycle can be initiated without regard to the adequacy of the engagement pressure between the tool and the workpiece. In the event of insufficient engagement force, the tool wanders off which phenomenon is greatly facilitated by the reduction of frictional engagement between the tool tip and workpiece due to the vibrations of the tool tip. Furthermore, the welding cycle can be initiated without regard to the amount of engagement pressure and, in the extreme condition, the welding cycle may be initiated and terminated prior to the existence of an engagement force between the tool and the workpiece. Therefore, welds may either be nonexistent due to lack of molten material and penetration, or the welds made may lack the required uniformity. Hence, there is no accurate control over the quality and uniformity of the individual welds, a rather disturbing fact when parts are assembled by mass production techniques.

U.S. Pat. No. 3,493,457 issued to John Jugler, entitled "Control Circuit for Tool Driven by Sonic Energy," dated Feb. 3, 1970 reveals an arrangement for triggering the weld cycle of a stationary ultrasonic welding apparatus in response to the existence of a predetermined engagement pressure between the tool and workpiece. This method overcomes the heretofore stated disadvantages, but the arrangement shown in the Juglar patent is not suitable for manually held tool since many of the elements present in a stationary ultrasonic welding stand are not provided in a portable, manually operable welding tool. This applies quite specifically to the piston, cylinder, air pressure and other parts disclosed in the prior patent.

The ultrasonic tool disclosed hereafter reveals a novel combination of elements and coaction of parts to utilize a predetermined force condition between the workpiece and the tool for causing initiation of the weld cycle. Moreover, the design disclosed hereafter eliminates the requirement for an operator to manually operate a switch for starting the weld cycle. Instead, the weld cycle is initiated automatically upon the existence of a predetermined engagement force. This feature, most importantly, eliminates the slipping of the tool along the workpiece surface, heretofore a common occurrence. Additionally, the improved tool disclosed hereinafter provides for a more uniform quality of welds made by a manipulatable ultrasonic tool.

One of the important objects of this invention, therefore, is the provision of a new and improved ultrasonic tool which overcomes several of the important shortcomings and disadvantages of the prior art devices.

Another important object of this invention is the provision of a manipulatable ultrasonic tool for providing spot welds in thermoplastic parts and requirig a predetermined engagement force between the tool and workpiece for initiating the weld cycle.

Another important object of this invention is the provision of a manually operable ultrasonic tool which eliminates the need for an external, operator controlled, switch for initiating the weld cycle.

Further and still other objects of this invention will become more clearly apparent by reference to the following description when taken in conjunction with the accompanying drawings.

DETAILED DESCRIPTION OF THE INVENTION

Figure 1:
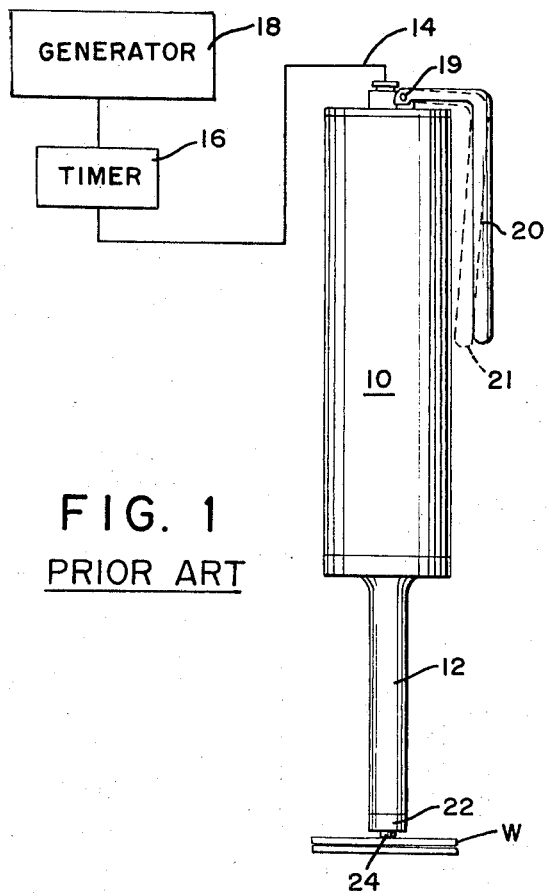
FIG. 1 is a schematic illustration of a prior art arrangement.
Figure 2:
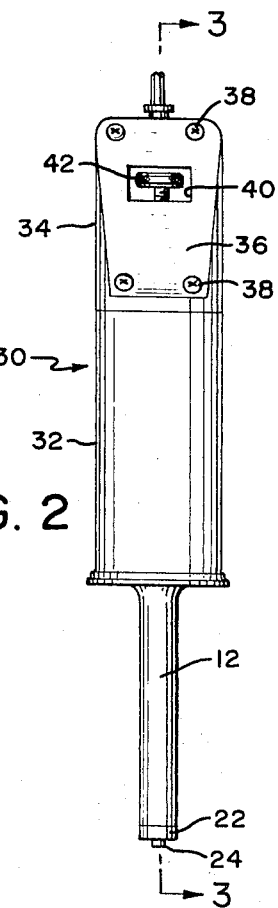
FIG. 2 is an elevational view of the improved welding tool according to the present invention.

Referring now to the figures and FIG. 1 in particular, a typical prior art ultrasonic welding tool is shown wherein numeral 10 identifies a housing enclosing an electroacoustic transducer for providing vibrations, typically at a predetermined frequency in the range from 16 to 100 kHz, to a resonator 12, also known as horn, tool, concentrator or amplitude transformer. The resonator is dimensioned to be resonant at the predetermined frequency. The transducer enclosed in the housing is connected via a cable 14 to a timer circuit 16 and to a high frequency electrical generator 18.

A pivotally mounted handle 20, pivoted at 19, acts as a trigger switch for causing, when pivoted toward the housing 10 is illustrated by the dashed lines 21, the generator 18 to supply electrical high frequency energy to the electroacoustic transducer for a predetermined time interval as controlled by the timer 16. In this manner, the output end 22 of the horn 12 is vibrating at the resonant frequency of the horn for a given time interval subsequent to the operation of the handle 20.

For use, the housing 10 with lever 20 is retained by an operator within the palm of his hands and the output end 22 having a tip 24 is pressed against the exposed surface of a workpiece W. The handle 20 is then squeezed and pivoted toward the housing 10, causing the vibrations manifest at the output end 22 of the horn 12 to be applied to the thermoplastic workpiece W. During the time interval in which the horn is vibrating, the tip 24 is urged manually into the workpiece. Resulting from the dissipation of sonic energy thermoplastic material melts at the location of the tip 24 and a spot weld is made as described in the patent to Fesh supra.

It will be apparent that the actuation of the timing cycle during which the vibrations are provided is in no way related to the existence of an engagement force between the horn 12 and the workpiece W. The transducer can be energized prior to the existence of an engagement force and the timing cycle may terminate long before a satisfactory weld has been achieved. Moreover, the welding cycle may be initiated under conditions of insufficient engagement pressure, in which case there is a tendency for the tip 24 to slide along the workpiece surface rather than remaining at the location where the weld is to be achieved. In fact, this latter case is a very frequent occurrence as operator fatigue sets in.

Referring now to the improved tool shown in FIGS. 2 through 5, numeral 30 identifies a metal housing comprising a cylindrical shell portion 32 and an upper portion 34 having a tapered front and a tapered back surface. The tapered front surface is provided with a cover plate 36 fastened to the housing by screws 38. A rectangular aperture 40 in the cover plate 36 provides access to a knurled knob 42 which serves to regulate the engagement force between the horn tip 24 and the workpiece W required to initiate the weld cycle.

Figure 3:
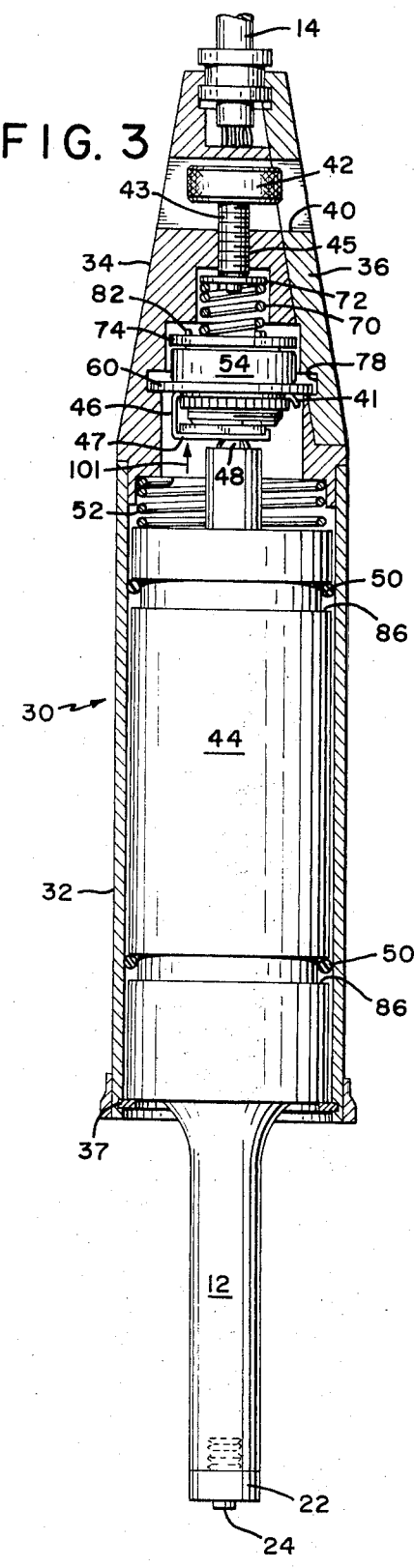
FIG. 3 is a sectional view along lines 3—3 in FIG. 2.
Figure 4:
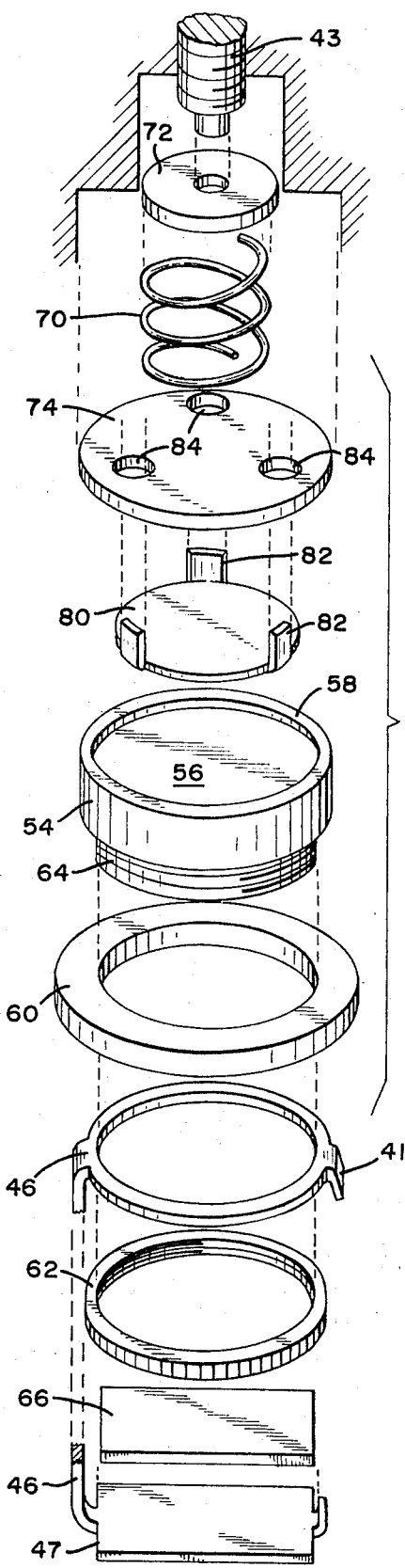
FIG. 4 is an exploded view of certain details shown in FIG. 3.

As more clearly seen in FIG. 3, the electroacoustic transducer 44 is contained within the cylindrical shell 32. The transducer receives electrical high frequency energy via the cable 14 which by a conductor (not shown) is coupled to the tab 41 of a metallic C-shaped connector 46, seen also in FIG. 4. The underside 47 of the connector 46 is in contact with a contact button 48 disposed at the upper end of the transducer 44 to supply the electrical high frequency energy from the generator 18 to the transducing means of the electroacoustic transducer 44. The transducing means may comprise a magnetostrictive means or piezoelectric means as is well understood by those skilled in the art. A typical electoracoustic transducer construction suitable for the present purpose using piezoelectric means is shown in U.S. Pat. No. 3,328,610, issued to S. E. Jacke et al, entitled "Sonic Wave Generator" dated June 27, 1967.

The transducer 44 is centered within the shell 32 and mounted for limited axial motion by a set of O-shaped rubber gaskets 50. These gaskets are not only relatively inexpensive when compared with the more conventional sleeve bushings or linear ball bearings, but assist also in restoring the transducer to its normally non-actuated position within the housing as will be more clearly evident from the following description.

The helical spring 52, a relatively soft spring compared to spring 70, serves for establishing a grounding connection. Downward motion of the transducer inside the shell portion 32 is limited by the annular ring 37.

Figure 5:
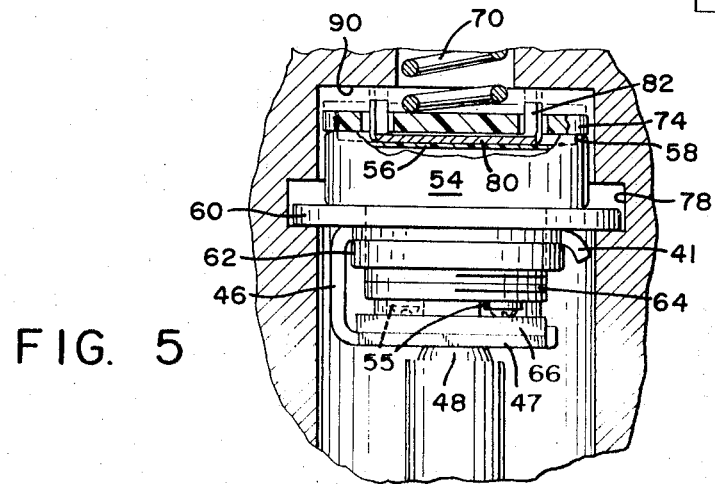
FIG. 5 is an enlarged view, partly in section, illustrating the actuation of the pressure responsive switching means.

A pressure responsive electrical circuit switch 54 is provided with a pressure sensitive surface in the form of a diaphragm 56 covering its upper side, and a pair of electrical circuit connections 55 at the underside, see FIG. 5. The diaphragm 56 is surrounded by a rigid, raised rim 58 which forms a part of the circular metal housing of the switch 54. The switch when assembled within the housing 30 includes an insulating washer 60, the upper portion of the C-shaped connector 46, an internally threaded mounting ring 62 tightly threaded upon the external thread 64 of the housing of the switch 54, an insulating strip 66 covering the connections 55, and the lower portion 47 of the connector 46. The ring 62 holds the connector 46 and washer 60 is assembled upon the switch 54.

The switch 54 is urged toward its lower position by the force exerted by a helical coil spring 70, one end of which is in contact with the underside of a washer 72 and the other end being in contact with the upper side of an insulating disk 74. The underside of disk 74 rests against the raised rim 58 of the switch 54. The spring by exerting a force against the switch housing urges the switch 54 to its lowered position, causing the underside of the washer 60 to be abutting contact with the lower radial surface of the recess 78. The force exerted by the spring 70 is adjustable by virtue of a knob 42, threaded stud 43 extending from the knob and engaging a thread 45 in the upper housing portion 34 of the housing 30, and washer 72 received by the front end of the stud 43.

A relatively light plate 80 with three circumferentially spaced upstanding prongs 82 is disposed between the electrical circuit switch 54 and disk 74. The diameter of the plate 80 is adjusted to be smaller than the diamter of the diaphragm 56. The plate 80 fits inside the space delineated by the rim 58. The prongs 82 fit through respective holes 84 in the disk 74, causing the plate 80 to be centered upon the diaphragm 56. When the switch is in its lowered position as shown in FIGS. 3 and 5, the plate 80 is in "floating," that is, exerting no pressure upon the diaphragm 56 of the switch 54 thereby causing the switch to remain non-actuated.

When the hand-held welding tool is set upon a workpiece so that the tip 24 of the horn 12 engages the workpiece W and pressure is applied by urging the shell 32, and hence the tool 30, toward the workpiece W, the transducer 44 is urged into upward motion relative to the shell 32, causing the O-ring gaskets 50 to slightly roll within the respective circumferential recesses 86. Simultaneously, the contact button 48 abutting against the lower portion 47 of the C-shaped connector 46 is raised and urges the switch 54 into upward motion (see arrow 101 FIG. 3), which motion is stopped when the upper end of the prongs 82 of plate 80 abut against the radial surface 90 of the housing, see dashed lines in FIG. 5. At this moment, the pronged plate 80 exerts pressure against the diaphragm 56, deflecting the diaphragm and causing the switch to become actuated, establishing a circuit across terminals 55 for operating the timing circuit 16. When lifting the tool from the workpiece, the switch 54 in response to the force of the spring 70 resumes its lowered and non-actuated position and the plate 80 "floats" once again.

The engagement force necessary for providing the flow of electrical energy to the transducer means 44 is adustable by the operator's thumb turning the knob 42 which is accessible through the aperture 40 in the plate 36.

It will become apparent that the timer 16 may be omitted from the circuit, in which case electrical energy is applied to the transducer only during such a time interval as a sufficient and predetermined engagement force between the workpiece and horn tip prevails. In this latter embodiment, the generator 18 is controlled by the opening and closing of the switch 54. When the engagement force ceases, the vibrations stop also.

A typical electrical switch suited for the present purpose is switch model TC-1 available from the Wild Rover Corporation of Norwood, New Jersey. It will be apparent that other and similar force responsive sensing means may be used to serve for the same purpose. Moreover, while the foregoing tool has been described in conjunction with spot welding, it will be apparent that other processes may be carried out as well, such as sealing and cutting, delamination, and the like.

While there has been described and illustrated a certain and preferred embodiment of this invention it will be apparent to those skilled in the art that modifications may be made without departing from the broad principle and spirit of this invention which shall be limited only by the scope of the appended claims.

What is claimed is:

1. A hand manipulated ultrasonic tool comprising:

a substantially cylindrical housing;

electroacoustic transducer means for converting electrical energy of predetermined high frequency applied to vibrations disposed in said housing;

means coupled to said transducer means for applying electrical energy thereto;

a resonator dimensioned to be resonant along its longitudinal axis at said predetermined frequency coupled with one end to said transducer means for receiving said vibrations and providing said vibrations to a workpiece in contact with the other end of said resonator;

pressure responsive switching means having a diaphragm coupled for controlling the application of electrical energy to said transducer means disposed in said housing, and a plate having a set of upstanding prongs mounted for limited axial motion in said housing in cooperative relation with said pressure responsive switching means for moving axially responsive to an engagement force of sufficient magnitude between said other end and the workpiece until said prongs engage a surface of said housing, such engagement limiting said axial motion and causing said plate to press upon said diaphragm for operating said switching means.

2. A hand manipulated ultrasonic tool as set forth in claim 1, said upstanding prongs fitting through holes in juxtaposed disk for locating said plate in relation to said diaphragm.

3. A hand manipulated ultrasonic tool comprising:

a substantially cylindrical housing;

electoracoustic transducer means for converting electrical energy of predetermined high frequency applied to vibrations;

means mounting said transducer means for limited axial motion within said housing;

a resonator dimensioned to be resonant at said predetermined frequency coupled with one end of said transducer means for receiving said vibrations and providing said vibrations to a workpiece in contact with the opposite end of said resonator;

a pressure responsive electrical circuit switch having a pressure sensitive surface disposed in said housing for controlling the application of electrical energy to said transducer means;

means cooperatively associated between said housing and said switch for providing limited axial motion of said switch in said housing;

a plate overlying said pressure sensitive surface;

adjustable force means disposed between said housing and said switch for causing the lack of a force between said pressure sensitive surface and said plate in the absence of an engagement force between said opposite end and a workpiece, and means causing, responsive to an engagement force of sufficient magnitude between said other end and a workpiece resulting from urging said housing toward the workpiece, said transducer and switch to move axially in said housing in opposition to the force provided by said force means and causing said plate to be forced against said pressure sensitive surface for actuating said switch.

4. A hand manipulatable tool comprising:

a shell;

electroacoustic transducer means disposed in said shell for converting electrical energy of predetermined high frequency applied to vibrations;

resilient means disposed between said shell and said transducer means for providing limited axial motion between said transducer means and said shell;

a resonator dimensioned to be resonant at said predetermined frequency coupled with one end to said transducer means for receiving said vibrations and providing said vibrations to a workpiece in contact with the other end of said resonator;

pressure responsive means connected for controlling the application of electrical energy to said transducer means disposed in said shell and operable responsive to the force exerted by an operator manipulating said shell and causing engagement between said other end of said resonator and the workpiece;

spring bias means adjustable by the combination of a knob and screw means disposed for being effective upon said pressure responsive means for causing said pressure responsive means to remain nonactuated in the absence of a predetermined engagement force between said other end and the workpiece, and an aperture disposed in said shell for providing access to said knob from the exterior of said shell for adjusting the bias provided by said spring bias means.

* * * * *